(12) United States Patent
Pfammatter et al.

(10) Patent No.: US 11,260,394 B2
(45) Date of Patent: Mar. 1, 2022

(54) APPARATUS FOR COMMINUTION OF DRIED PLANTS

(71) Applicant: Unicaps GmbH, Frankfurt an der Oder (DE)

(72) Inventors: Lukas Pfammatter, Oberaegeri (CH); Marco Aschwanden, Rotkreuz (CH)

( * ) Notice: Subject to any disclaimer, the term of this patent is extended or adjusted under 35 U.S.C. 154(b) by 174 days.

(21) Appl. No.: 16/318,702

(22) PCT Filed: Jun. 29, 2017

(86) PCT No.: PCT/IB2017/053914
§ 371 (c)(1),
(2) Date: Jan. 22, 2019

(87) PCT Pub. No.: WO2018/020339
PCT Pub. Date: Feb. 1, 2018

(65) Prior Publication Data
US 2019/0183140 A1    Jun. 20, 2019

(30) Foreign Application Priority Data

Jul. 26, 2016    (CH) .................................... 00974/16

(51) Int. Cl.
*B02C 4/08*    (2006.01)
*B02C 4/20*    (2006.01)
(Continued)

(52) U.S. Cl.
CPC .................. *B02C 4/08* (2013.01); *A23F 3/12* (2013.01); *B02C 4/02* (2013.01); *B02C 4/20* (2013.01); *B02C 4/34* (2013.01)

(58) Field of Classification Search
CPC .... B02C 4/08; B02C 4/02; B02C 4/20; B02C 4/34; B02C 21/002
See application file for complete search history.

(56) References Cited

U.S. PATENT DOCUMENTS 1,349,221 A * 8/1920 Nolen ........................ B02C 4/32
                                                                241/232
1,401,445 A * 12/1921 Rodger ..................... B02C 4/08
                                                                 241/17
(Continued)

FOREIGN PATENT DOCUMENTS

CN          202135657 U       2/2012
EP            2660161 A1      11/2013
(Continued)

OTHER PUBLICATIONS

ISR and written opinion, dated Oct. 16, 2017, from parent International appl. PCT/IB2017/053914 published as WO2018/020339A1, with English translation of ISR.

(Continued)

*Primary Examiner* — Faye Francis
(74) *Attorney, Agent, or Firm* — George Kapsalas

(57) ABSTRACT

Apparatus for comminution of dried tea leaves, herbs and other dried plants and their component parts. The apparatus facilitates gentle comminution of the comminuted commodity. The apparatus includes arrangements of driven comminuting rollers and housing (1) with an overhead inlet (6) and a bottom outlet (7) for ground commodity, and may include at least two or more rotatably driven comminuting rollers (2, 3) arranged in at least two or more levels (4, 5) one above the other. The rollers (2, 3) are studded with cams (24) for a comminution operation. Combs (15) may interface with the comminuting rollers. Comb adjusters (23) facilitate adjustment of combs that are adjustable.

19 Claims, 7 Drawing Sheets

(51) Int. Cl.
*B02C 4/34* (2006.01)
*B02C 4/02* (2006.01)
*A23F 3/12* (2006.01)

(56) References Cited

U.S. PATENT DOCUMENTS

| | | | | | |
|---|---|---|---|---|---|
| 2,027,782 | A | * | 1/1936 | Lundgren | B02C 4/286 241/61 |
| 2,200,576 | A | * | 5/1940 | Hawkins | B02C 4/02 241/159 |
| 2,991,019 | A | * | 7/1961 | Sugden | B02C 4/286 241/112 |
| 3,129,897 | A | * | 4/1964 | Brown et al. | B02C 4/286 241/143 |
| 3,190,572 | A | * | 6/1965 | Goto | A47J 42/32 241/235 |
| 3,491,952 | A | * | 1/1970 | Krolopp | B02C 4/286 241/13 |
| 3,933,086 | A | * | 1/1976 | Standing | A23N 15/06 99/646 R |
| 4,630,781 | A | * | 12/1986 | Brown, Jr | B02C 4/08 241/159 |
| 5,312,052 | A | * | 5/1994 | Dellekamp | B29B 17/02 241/24.14 |
| 5,375,779 | A | * | 12/1994 | Ephraim | B02C 4/02 241/24.1 |
| 5,927,627 | A | * | 7/1999 | Edson | B29B 17/0404 241/159 |
| 6,129,296 | A | * | 10/2000 | Campbell | B02C 4/06 241/225 |
| 8,070,078 | B2 | * | 12/2011 | Bearman | B02C 4/02 241/1 |
| 8,727,253 | B2 | * | 5/2014 | Smith | B02C 4/42 241/152.1 |
| 2007/0170291 | A1 | * | 7/2007 | Naganawa | B02C 4/02 241/159 |
| 2009/0114749 | A1 | * | 5/2009 | Futa | B02C 4/02 241/30 |
| 2015/0209792 | A1 | * | 7/2015 | Favre | A23F 3/12 426/410 |
| 2017/0008003 | A1 | * | 1/2017 | Cleminson | B01F 5/246 |
| 2019/0176158 | A1 | * | 6/2019 | Tagawa | B02B 7/02 |

FOREIGN PATENT DOCUMENTS

| | | |
|---|---|---|
| GB | 132765 A | 8/1919 |
| GB | 281922 A | 12/1927 |
| GB | 282147 A | 12/1927 |
| GB | 559937 A | 3/1944 |
| GB | 820726 A | 9/1959 |
| GB | 2158338 A | 11/1985 |
| JP | S51-023856 A | 2/1976 |
| JP | H05-015792 A | 1/1993 |
| JP | 2003-260452 A | 9/2003 |
| JP | 2015-520704 A | 7/2015 |
| SU | 400305 A | 10/1973 |
| SU | 454020 A | 12/1974 |
| WO | 2018/020340 A1 | 2/2018 |

OTHER PUBLICATIONS

English translation of the ISA Written Opinion of Oct. 16, 2017, form PCT/ISA/237.

* cited by examiner

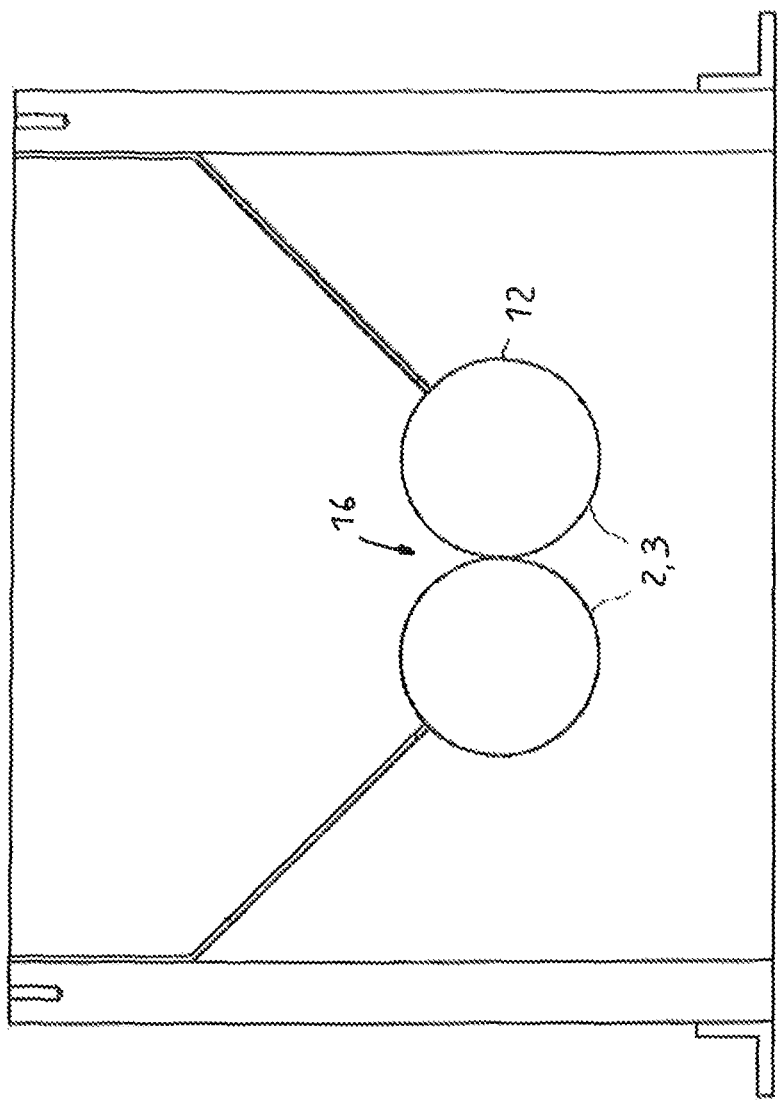

APPARATUS FOR COMMINUTION OF DRIED PLANTS

This application is a 35 U.S.C. 371 national-phase entry of PCT International application no. PCT/IB2017/053914 filed on Jun. 29, 2017 and also claims benefit of priority to prior Swiss national application no. CH 00974/16 filed on Jul. 26, 2016, and parent PCT International application no. PCT/IB2017/053914 is integral, in its entirety for all intents and purposes, with the present U.S. application.

BACKGROUND

The present disclosure pertains to apparatus for comminution/crushing of dried plants, in particular for comminution of dried tea leaves, herbs, and other dried plants and their component parts.

Generic apparatus for comminuting or cutting tea leaves are already known from the prior art. Here, in a housing, there are used rotatably arranged rollers that are studded with cams, cutting edges, or similar other elements. A further such roller or a comb-shaped element may be matched as a counterpart, wherein the tea leaves are ground or cut in the hollow spaces or gaps between roller and counterpart. The tea leaves are delivered out of a bin arranged above the roller. The comminuted tea leaves are detected and removed below the roller, for example in a collection and discharge arrangement.

Commonly there are multiple gaps arranged in the vertical direction, wherein the comminution from large to fine takes place. The rollers and combs therefore have diverse geometries and/or will be driven with different parameters, as this is disclosed, for example, in foreign patent publications GB2158338A, GB132765A, GB282147A or EP2660161A1. As a consequence of the intensive comminution, cell structures of tea leaves are destroyed, and constituents or aromas get lost. Furthermore, flavor-diminishing particulates or others can accumulate.

Also known is a comminution of tea leaves in the roller clearance between rollers of a roller pair with cutting rollers, among others according to GB820726A, GB559937A, SU454020A1 or SU400305A1.

Another such device is disclosed in EP2660161A1. Here, there are three rollers in a housing stacked one upon the other, and, respectively, one below the other. Above the uppermost roller, a supply hopper for the supply of tea leaves is arranged, and below the lowermost roller is a funnel-shaped discharge device for the crushed tea leaves. Via employed V-shaped oblique guide plates which, at their to-roller facing frontal area, merge into a comb, the tea leaves are directed to the rollers, where they are reduced to small pieces between the roller's cutting cams and the comb's cutting elements.

The crushed tea leaves fall in direction of the underlying roller or, after the third roller, into the discharge unit, wherein the comminution again from large to fine occurs. The comminution takes place in a protective gas atmosphere, as nitrogen is supplied into the housing. As in the rest of the prior art, an adjustment of the comminuting parameters takes place horizontally from the side and in particular from the front, through adjusting mechanisms arranged on the housing.

SUMMARY

The present disclosure presents apparatus for comminution of dry plants, especially for comminution of dried tea leaves, herbs and other dry plants and their component parts, that enables a gentle comminution of said commodity as well as an easy adjustment of the crushing parameters. The problem may be solved within the scope of the present disclosure.

Exemplary apparatus within the scope of the present disclosure may comprise a housing with an overhead inlet for the commodity to be comminuted and a bottom outlet for the ground commodity.

In the housing, downstream of the inlet, are arranged at least two identical rotatable and driven rollers as individual roller passages one above the other in at least two levels (comminuting chambers), each with at least one respective roller per level. Identical here means that the dimensions and configuration of the rollers, and preferably also the comminuting parameters of each roller, are the same.

Each roller corresponds to at least one adjustable comb.

Preferably, directed to the left or right respectively of each roller there are arranged guide plates inclined relative to the housing's side wall and directed toward the rollers, and being provided with corresponding-shaped, structured combs at the level of the rollers.

The commodity's comminution takes place via entry, between the roller and the comb, of the commodity introduced through the inlet, wherein the cams and notches or grooves of the rotating rollers cause entrainment and discharge of the comminuted product, insofar as this has not already occurred under the influence of gravity.

Exemplary apparatus within the scope of the present disclosure may make it possible, in particular, to gently comminute dried tea leaves or other dried plants or plant parts in such a way that the desirable characteristics are preserved. This means that cell walls are preserved or only minimally damaged, and that during preparation of tea, optimal flavor evolvement is attained. This also makes it possible, with tea or other substance portionable into capsules, to extract sufficiently many flavors from the tea material despite short contact time with hot water. Exemplary preferred versions are disclosed within the scope of the present disclosure.

An implementation of the device with only one roller per level is contemplated within the scope of the present disclosure. In preferred implementation, four rollers may be arranged in two levels one above the other in the housing, each two individual rollers per level as individual roller passages. In the upper level, the individual rollers have a greater separation distance from each other than in the lower level, wherein the feeding of the lower roller(s) is achieved by gravity. The rollers should not be arranged perpendicular, one above the other. The offset of shaft center distances between the roller of the upper level to the roller of the lower level should amount to at least 10 mm.

This roller arrangement allows adjustment of the distance between the roller and comb or an adjustment of the comb in the vertical direction via manipulation of adjusting mechanisms from above. The adjusting mechanisms are arranged in or above the upper level, allowing for an adjustability of the combs of the lower level.

At the same time, this enables a compact, modular arrangement of several apparatus next to each other in series and/or in a row as a packaging array, for an increase of the comminution capacity.

In another version the rollers in each level may also be arranged in pairs, wherein each roller pair is arranged so that the rollers rotate against each other or engage each other, and wherein the rotational speed is variable and analogous to the arrangement of individual rollers.

The cams preferably manifest a height P (and accordingly the grooves a corresponding depth) of at least 3.5 mm and a width W of up to 6 mm. The distance L between two cams (or the width of the groove) in the axial and radial directions is smaller than, or at most equal to, the width W of the cams.

On both levels, for the commodity to be comminuted there is arranged between the rollers a triangular partial and feed plate, which is a guide assembly formed between the rollers with the peak up.

In a further preferred implementation, the apparatus may be provided with components for aspiration, in particular for a continuous operation of the apparatus and thereby necessitated dust removal.

Furthermore, apparatus within the scope of the present disclosure may be designed to be stationary or movable.

The comminution procedure preferably takes place in an oxidative standard atmosphere in the housing of the apparatus.

In addition, the crushed commodity subsequently may also be filled, under a nitrogen atmosphere, into capsules analogous to coffee capsules.

BRIEF DESCRIPTION OF THE DRAWINGS

Several exemplary versions are described more closely below with reference to the appended drawings. In the drawings are presented:

FIG. 5: a paired arrangement of rollers;

DETAILED DESCRIPTION

Figure 1:
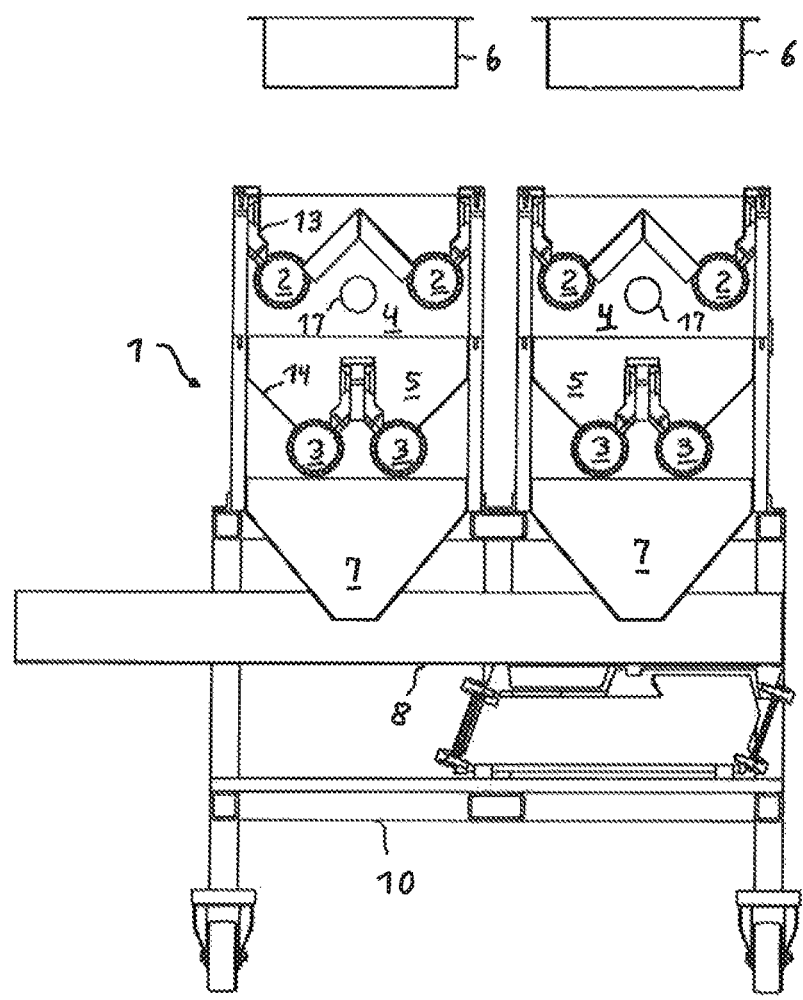
FIG. 1: a simplified representation of an apparatus according to the disclosure.

An exemplary apparatus according to the present disclosure (FIG. 1) for comminuting dry plants, for example dried tea leaves, includes a housing 1 in which four identical steel rollers 2, 3 are arranged one pair above the other in two levels 4, 5, every two respective rollers 2, 3 per respective level 4, 5. In the upper level 4, the rollers 2 have a greater spacing to one another than in the lower level 5.

Above the upper level 4, a funnel-shaped inlet 6 is provided for uncomminuted tea leaves, out of which they fall freely to reach the upper rollers 2. Thus, supply to the lower roller(s) 3 is achieved essentially by means of gravity. An outlet 7 for crushed tea leaves is provided in the housing 1, underneath the lower rollers 3. At free fall from this outlet 7, the crushed tea leaves end up on a device for transporting them, for example a conveyor belt 8. The inlet 6 and outlet 7 may extend over the entire length of the rollers 2, 3.

A feeder 9 for uncomminuted tea leaves (FIG. 2) is associated to inlet 6, from which the inlet 6 is loaded. This feeder 9 may be controlled and regulated with regard to the amount of tea leaves to be delivered per unit time.

The rollers have a length of approximately 530 mm but could also be up to about 800 mm long. They are furnished on the peripheral surface 12 continuously with cams 24 and notches or grooves 25, as are well known in the prior art. Two neighboring cams 24 are respectively spaced apart from one another in the axial and radial directions by a groove 25.

In the axial direction of the roller 2, 3, the cams 24 have an equal distance from each other, and analogously in the radial direction on the perimeter. The axial and the radial size of the separation between two cams 24 may be selected to be the same or different.

Figure 4A:
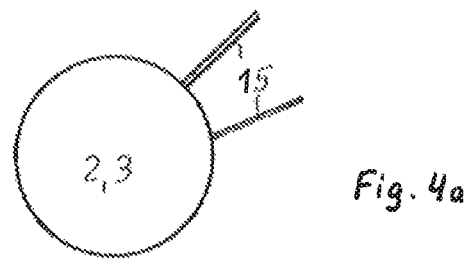
FIG. 4: a roller (FIG. 4a) and details of the roller (FIG. 4b)
Figure 4B:
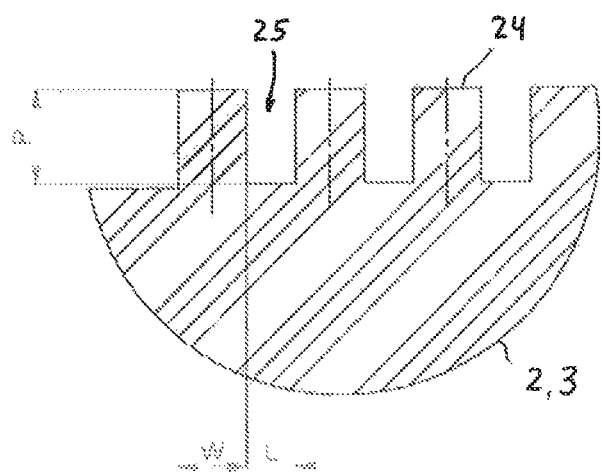

The cams 24 possess a height P of at least 3.5 mm and a width of up to 6 mm (compare FIG. 4b). A smaller value for the height P and larger values for the width W affect the throughput and the degree of comminution.

The gap L between two cams, or the width of the groove 25, is chosen to be smaller in axial and radial directions than the width W of the cam 24. In general, the relations W>L und W<2L should exist.

The rollers 2, 3 may be driven at variable rotational speed, wherein the rotational speed of the respective individual rollers 2, 3 among themselves should not differ from each other.

The rollers 2, 3 may be identical in both levels 4, 5, or, in another implementation, each level 4, 5 may be designed differently. With diverse design, the rollers 2 of the upper level 4 are formed and operable so that they produce, compared to the lower level, a coarser crushing of the tea leaves. A finer comminution of the pre-crushed tea leaves then subsequently takes place in the lower level 5.

Furthermore, inclined associated guide plates 13, 14 are directed to the rollers 2, 3. These guide plates deliver the tea leaves to the rollers 2, 3 (FIGS. 1, 3) and homogenize the flow of supplied tea leaves over the roller length.

At the level of the rollers 2, 3, the guide plates 13, 14 are designed comb-like, and these guide plates likewise feature cams and grooves that comb/interact with the cams 24 and grooves 25 of the rollers 2, 3. The combs 15 may also be designed as separate elements that are arranged on the guide plates 13, 14.

In order to increase the comminution capacity of every roller 2, 3, two combs 15 may be associated with each roller 2, 3, as illustrated in simplified form in FIG. 4a. The combs 15 are arranged approximately parallel or slightly angled to one another. Such an implementation doubles the capacity per roller 2, 3 with comparatively little extra expenditure for the second comb 15.

Figure 3:
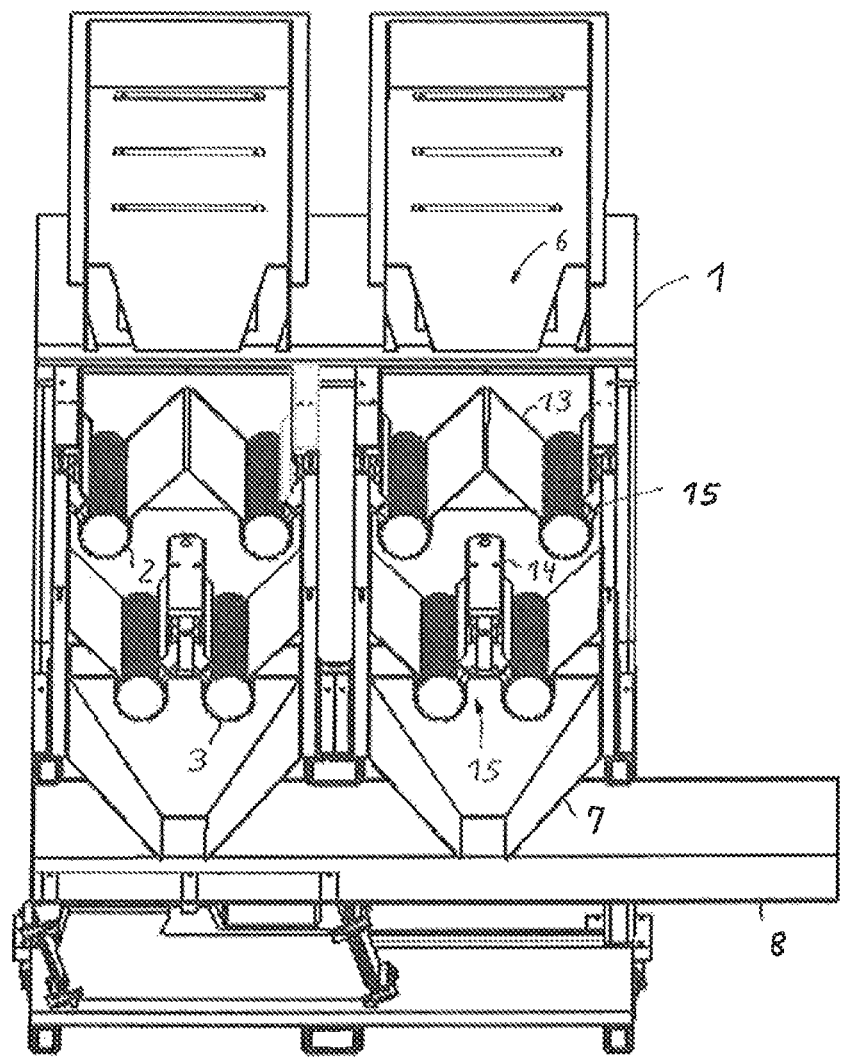
FIG. 3: apparatus according to the disclosure in another configuration.
Figure 7:
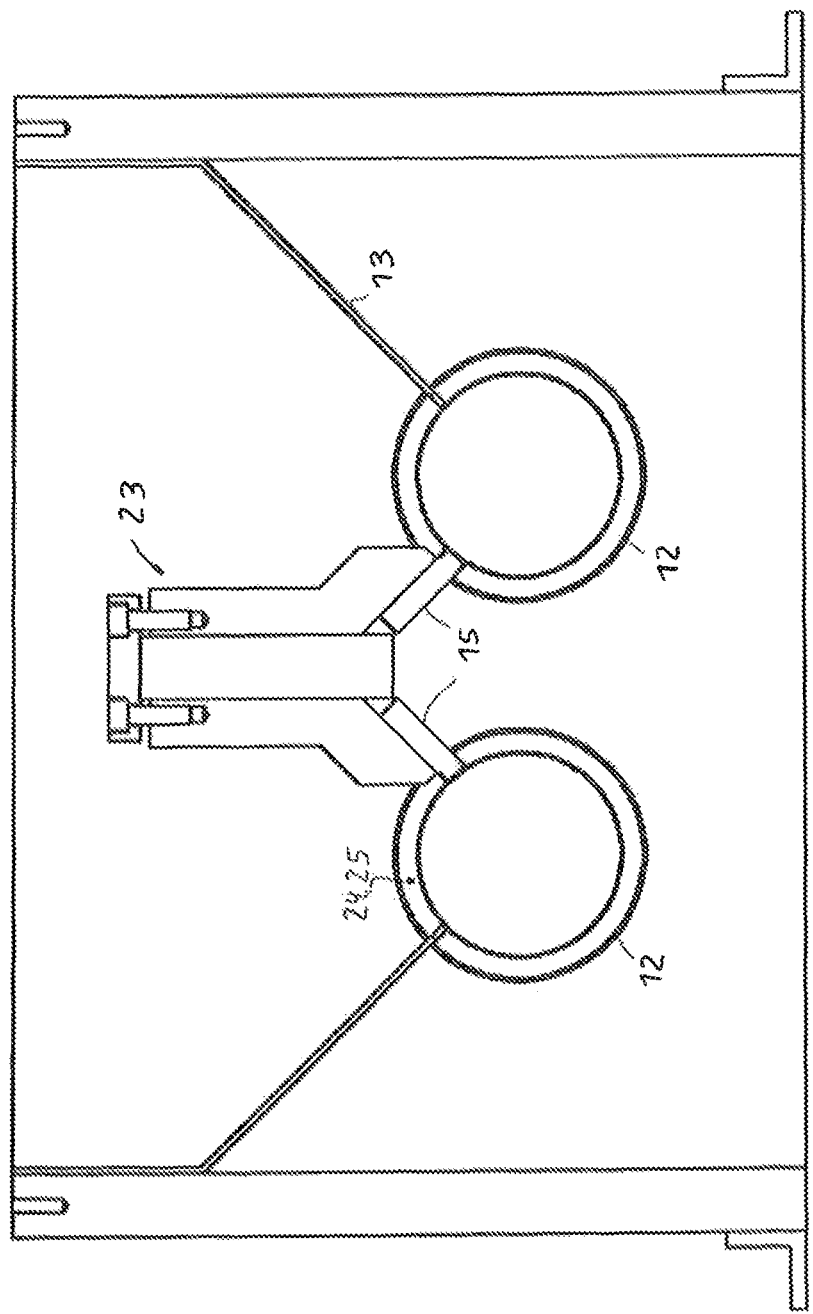
FIG. 7: an exemplary adjusting device for a comb.

On both levels, there is a guide assembly, for example guide plate 14 (triangular partial and feed plate) assembly that is formed with its peak up (FIG. 3, FIG. 7). Associated with the guide plate 14 is an adjusting device 23 for adjusting of the combs in the vertical direction, or rather of the distance between roller and comb 15.

In order to ensure the adjustability of the combs 15 in both levels 4, 5 from above, the offset of shaft center distances between the roller 2 of the upper level 4 to the roller 3 of the lower level 5 should amount to at least 10 mm.

In another version, instead of single roller passages, the rollers 2, 3 may also be arranged (FIG. 5) in pairs with a roller clearance 16 between them, in at least one of the levels 4, 5. They revolve relative to each other, cams 24 and grooves 25 of both rollers 2, 3 being intermeshed. The mutual spacing between the rollers, or the nip 16, is also adjustable from above by means of adjusting apparatus not explicitly shown in FIG. 5. This design also allows a very compact construction and a higher capacity per roller 2, 3, since the rotational speed may be increased compared to single-roller passages.

The adjustment of the rollers 2, 3 and, in particular, of the combs 15 occurs in the vertical direction via manipulation from above, via adjusting device 23 at least in the upper level 4 but preferably in both levels (FIG. 7). This permits a very compact construction of apparatus according to the present description, with a small footprint and thus also a very dense arrangement of several apparatus side by side and/or one after another.

Figure 6:
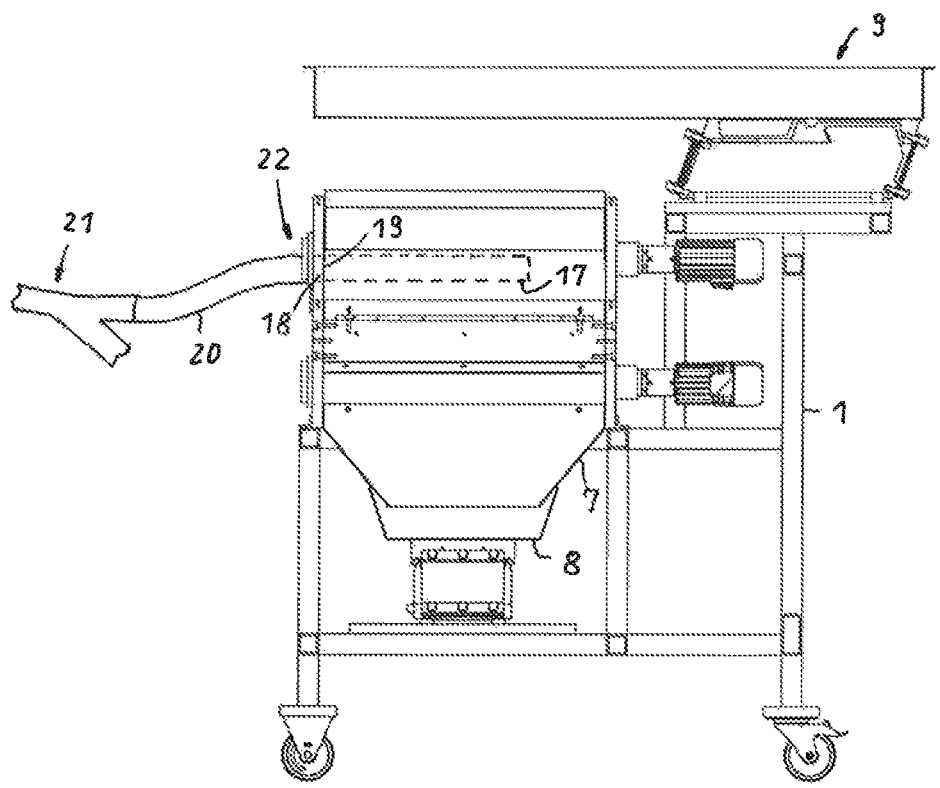
FIG. 6: an aspiration of the apparatus according to the disclosure.

Comminution of the tea leaves occurs in an oxidative standard atmosphere in the apparatus. For a continuous operation, the apparatus according to the present description may be furnished with an aspiration in order to prevent the accumulation of tea dust or other particles. For this, preferably a perforated conduit 17 made of stainless steel is provided per level 4, 5. The perforated conduit 17 is disposed by means of a foodstuffs-approved flange seal 18 on one side in the housing 1 (FIG. 6). One end of the conduit 17 protrudes from the housing 1, and the other end is exposed and open in the housing 1. The conduit 17 extends to a large extent over the length of the rollers 2, 3. Across a flange coupling 19 provided with a throttle valve 22, and via a hose 20, the conduit 17 is connected to a suction device 21 shown in simplified form. The suction device 21 may, in turn, be coupled to an exhaust air filter, preferably an explosion-resistant exhaust filter.

All adjustment and control operations are preferably carried out electronically, but a manual control is also possible.

Figure 2:
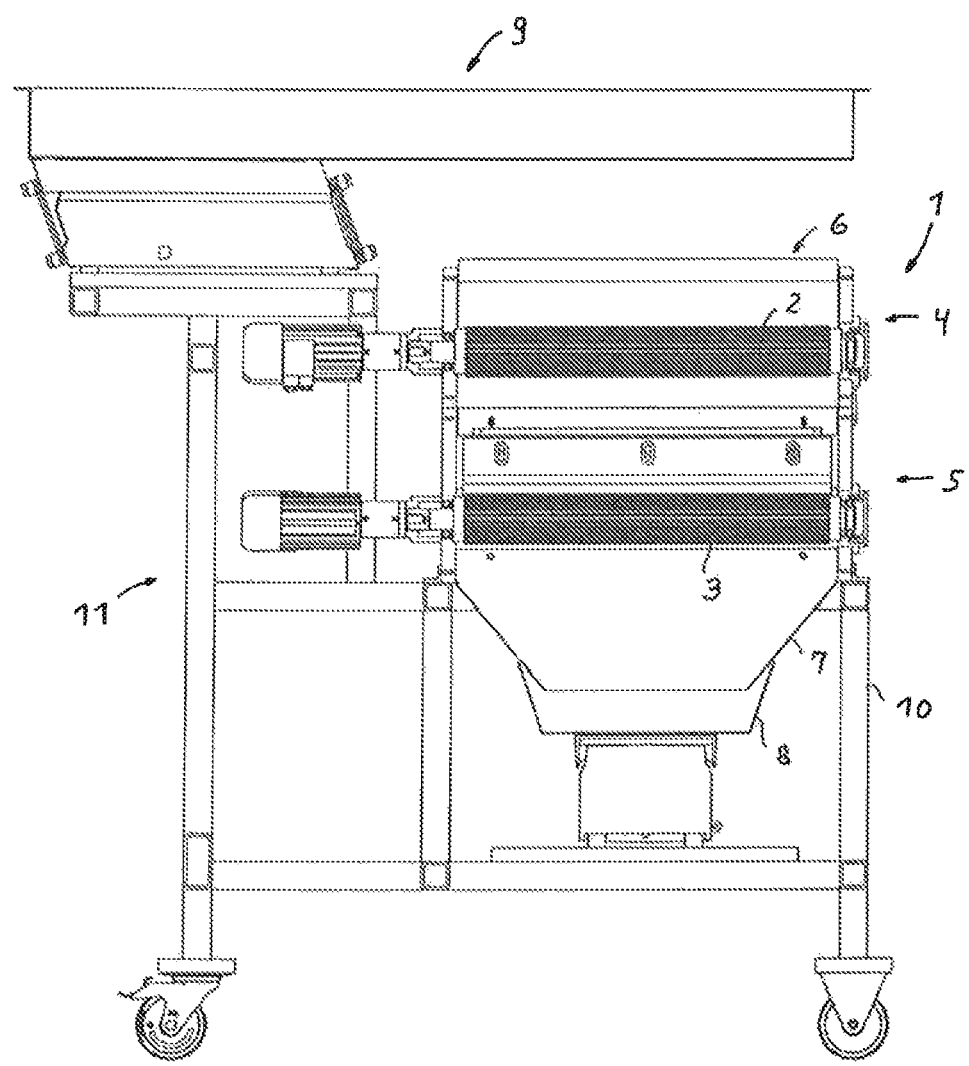
FIG. 2: the apparatus according to FIG. 1 in side view.

Apparatus according to the present disclosure, like the feeder 9, may also be arranged stationary, or, as depicted in FIGS. 1 and 2, may be mounted on mobile frames 10, 11. Here, the frame 10 for the apparatus according to the present disclosure may support the conveyor belt 8.

In a very simplified manner, only a single roller 2 may be provided to the apparatus. Here, the roller 2 is also downstream to the inlet 6 in the vertical direction, but corresponds to two combs 15 like represented in FIG. 5.

An adjustment of the combs 15 in the vertical direction is again provided via manipulation of at least one comb adjuster from above, wherein the adjusting mechanism is arranged in or above the housing 1, or single level 4 in this version.

In closing, it should be noted that the above description is intended to illustrate rather than limit the invention, and that readers skilled in the technological art shall be capable of designing alternative embodiments without departing from the protected scope of invention as set forth by the appended claims. As equivalent elements can be substituted for elements employed in claimed invention so as to obtain substantially the same results in substantially the same way, the protected scope of the present invention is defined by the appended claims, including known equivalents and unforeseeable equivalents at the time of filing of this application. Furthermore, in the following claims, the verb 'comprise' and its conjugations do not exclude the presence of elements or steps other than those listed in any claim or the specification as a whole. The singular reference of an element does not necessarily exclude the plural reference of such elements and vice-versa. The mere fact that certain elements or steps may be recited in mutually different dependent claims does not necessarily indicate that a combination of these elements or steps cannot possibly be used to advantage.

LIST OF REFERENCE LABELS

1 housing
2 roller
3 roller
4 upper level
5 lower level
6 inlet
7 outlet
8 conveyor
9 feeder
10 frame
11 frame
12 peripheral surface
13 guide plate
14 guide plate
15 comb
16 nip (gap) between rollers/roller clearance
17 pipe
18 flange seal
19 flange coupling
20 hose
21 suction device
22 throttle valve
23 adjusting device
24 cam
25 groove
L width of a groove
P height of a cam
W width of a cam

What is claimed is:

1. An apparatus for comminution of dried plants, the apparatus comprising:
    a housing, said housing including an upper inlet, said housing including a bottom outlet;
    a first driven comminuting roller, said first driven comminuting roller having a first shaft center;
    a second driven comminuting roller, said second driven comminuting roller having a second shaft center;
    said first and second driven comminuting rollers being rotatably mounted in a first comminuting level of said housing, and said first and second driven comminuting rollers forming a first pair of driven comminuting rollers that has a first separation distance between said first and second shaft centers;
    a third driven comminuting roller, said third driven comminuting roller having a third shaft center;
    a fourth driven comminuting roller, said fourth driven comminuting roller having a fourth shaft center;
    said third and fourth driven comminuting rollers being rotatably mounted in a second comminuting level lying below said first comminuting level of said housing, and said third and fourth driven comminuting rollers forming a second pair of driven comminuting rollers that has a second separation distance between said third and fourth shaft centers, said first separation distance being larger than said second separation distance by a value of at least 10 mm;
    each one of said first, second, third and fourth driven comminuting rollers respectively having a respective toothed comb associated with it, each of said driven comminuting rollers having respective circumferential radial grooves, and each toothed comb having respective comb teeth that comb said circumferential radial grooves of its respective associated driven comminuting roller;
    a plurality of inclined guide plates each respectively directed to a respective one of said driven comminuting rollers;
    each of said inclined guide plates being inclined upwards towards a housing side wall, and each respective inclined guide plate respectively being provided each with a respective one of said toothed combs.

2. An apparatus for comminution of dried plants as claimed in claim 1, the apparatus further comprising:

an additional toothed comb associated with one of said driven comminuting rollers, said additional toothed comb having respective comb teeth that comb said circumferential radial grooves of its associated driven comminuting roller.

3. An apparatus for comminution of dried plants as claimed in claim 1, the apparatus further comprising:
a comb adjuster operatively connected to adjust the respective toothed comb which one of said inclined guide plates is provided with, said comb adjuster being located above the respective toothed comb to which it is operatively connected.

4. The apparatus for comminution of dried plants as claimed in claim 3, wherein:
said comb adjuster is a manipulatable mechanism located in said housing.

5. An apparatus for comminution of dried plants as claimed in claim 1, the apparatus further comprising:
a guide plate assembly between said first pair of driven comminuting rollers, said guide plate assembly having an at least partially triangular layout with peak vertex lying in a direction towards said upper inlet.

6. An apparatus for comminution of dried plants as claimed in claim 5, the apparatus further comprising:
a second-level guide assembly between said second pair of driven comminuting rollers, said second-level guide assembly having an upper portion lying in a direction towards said upper inlet;
said second-level guide assembly having respective adjustable toothed combs respectively interfacing, each to a respective one, with said third and fourth driven comminuting rollers of said second pair of driven comminuting rollers; and,
a comb adjuster operatively connected to adjust respective distances between said adjustable toothed combs and their respective interfacing comminuting rollers, said comb adjuster being located at said upper portion of said second-level guide assembly.

7. An apparatus for comminution of dried plants as claimed in claim 1, the apparatus further comprising:
cams provided on said driven comminuting rollers, said cams having a height (P) of at least 3.5 mm and a width (W) of up to 6 mm.

8. The apparatus for comminution of dried plants as claimed in claim 7, wherein:
a distance (L) between two adjacent cams in the axial and in the radial directions of one of said driven comminuting rollers is smaller than the width (W) of said cams, observing the relation (W)<2(L).

9. An apparatus for comminution of dried plants as claimed in claim 1, the apparatus further comprising:
an aspiration unit connected to said housing to aspirate at ambient atmospheric pressure.

10. An apparatus for comminution of dried plants, the apparatus comprising:
a housing, said housing including an upper inlet, said housing including a bottom outlet;
a first pair of driven comminuting rollers, said first pair of driven comminuting rollers being rotatably mounted in a first comminuting level of said housing;
a second pair of driven comminuting rollers, said second pair of driven comminuting rollers being rotatably mounted in a second comminuting level of said housing, said second comminuting level lying below said first comminuting level and said second pair of driven comminuting rollers being under said first pair of driven comminuting rollers;
each of said driven comminuting rollers respectively having a respective adjustable toothed comb interfacing with it, each of said driven comminuting rollers having respective circumferential radial grooves, and each adjustable toothed comb having respective comb teeth that comb said circumferential radial grooves of its respective interfaced driven comminuting roller;
a guide assembly between said driven comminuting rollers of one of said pairs of driven comminuting rollers, said guide assembly including an at least partially triangular layout with peak vertex lying in a direction towards said upper inlet; and,
said guide assembly having toothed combs respectively interfacing, each to a respective one, with said driven comminuting rollers of one of said pairs of driven comminuting rollers.

11. An apparatus for comminution of dried plants as claimed in claim 10, the apparatus further comprising:
a comb adjuster operatively connected to adjust said toothed combs of said guide assembly, said comb adjuster being located above said toothed combs of said guide assembly.

12. The apparatus for comminution of dried plants as claimed in claim 11, wherein:
said comb adjuster is a manipulatable mechanism located in said housing.

13. An apparatus for comminution of dried plants as claimed in claim 10, the apparatus further comprising:
a comb adjuster operatively connected to adjust respective distances between (a) said toothed combs of said guide assembly, and (b) their respective interfacing driven comminuting rollers; and,
said comb adjuster being located at an upper portion of said guide assembly.

14. An apparatus for comminution of dried plants as claimed in claim 10, the apparatus further comprising:
a plurality of inclined guide plates each respectively directed to a respective one of said driven comminuting rollers;
each of said inclined guide plates being inclined upwards towards a housing side wall, and each inclined guide plate respectively being provided each with a respective toothed comb.

15. An apparatus for comminution of dried plants as claimed in claim 14, the apparatus further comprising:
a comb adjuster operatively connected to adjust the respective provided toothed comb of one of said inclined guide plates, said comb adjuster being located above its operatively connected toothed comb.

16. The apparatus for comminution of dried plants as claimed in claim 15, wherein:
said comb adjuster is a manipulatable mechanism located in said housing.

17. An apparatus for comminution of dried plants as claimed in claim 10, the apparatus further comprising:
an additional toothed comb associated with one of said driven comminuting rollers, said additional toothed comb having respective comb teeth that comb said circumferential radial grooves of its associated driven comminuting roller.

18. An apparatus for comminution of dried plants, the apparatus comprising:
a housing, said housing including an upper inlet, said housing including a bottom outlet;
a first pair of driven comminuting rollers, said first pair of driven comminuting rollers being rotatably mounted in a first comminuting level of said housing;

a second pair of driven comminuting rollers, said second pair of driven comminuting rollers being rotatably mounted in a second comminuting level of said housing, said second comminuting level lying below said first comminuting level and said second pair of rollers being under said first pair of rollers;

a guide assembly between said driven comminuting rollers of one of said pairs of driven comminuting rollers;

a plurality of inclined guide plates each respectively directed to a respective one of each of said driven comminuting rollers, and each of said driven comminuting rollers having respective circumferential radial grooves;

each of said inclined guide plates being inclined upwards towards a housing side wall, and each inclined guide plate respectively being provided each with a respective toothed comb having respective comb teeth that comb said circumferential radial grooves of the respective driven comminuting roller to which the respective inclined guide plate is directed;

a plurality of adjustable toothed combs each of which is respectively associated with a respective one of said driven comminuting rollers, each adjustable toothed comb having respective comb teeth that comb said circumferential radial grooves of its respective associated driven comminuting roller; and, comb adjusters being operatively connected to adjust said adjustable toothed combs, each of said comb adjusters being located above a respective adjustable toothed comb that it adjusts.

19. An apparatus for comminution of dried plants as claimed in claim 18, the apparatus further comprising:

an upper portion of said guide assembly, said upper portion lying in a direction towards said upper inlet;

said guide assembly having adjustable toothed combs respectively interfacing, each to a respective one, with said driven comminuting rollers between which said guide assembly is disposed, each adjustable toothed comb of said guide assembly having respective comb teeth that comb said circumferential radial grooves of its respective interfaced driven comminuting roller; and, a guide assembly comb adjuster operatively connected to adjust respective distances between said guide assembly's adjustable toothed combs and their respective interfacing driven comminuting rollers, said guide assembly comb adjuster being located at said upper portion of said guide assembly.

* * * * *